(12) United States Patent
Hsu et al.

(10) Patent No.: US 8,364,998 B2
(45) Date of Patent: *Jan. 29, 2013

(54) ADAPTIVE REAL-TIME METHODOLOGY FOR OPTIMIZING ENERGY-EFFICIENT COMPUTING

(75) Inventors: Chung-Hsing Hsu, Knoxville, TN (US); Wu-Chun Feng, Blacksburg, VA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/032,472

(22) Filed: Feb. 22, 2011

(65) Prior Publication Data

US 2011/0239006 A1   Sep. 29, 2011

Related U.S. Application Data

(63) Continuation of application No. 11/556,651, filed on Nov. 3, 2006, now Pat. No. 7,971,073.

(60) Provisional application No. 60/733,140, filed on Nov. 3, 2005.

(51) Int. Cl.
  *G06F 1/32* (2006.01)
  *G06F 1/26* (2006.01)
  *G05B 13/02* (2006.01)

(52) U.S. Cl. ........ 713/322; 713/300; 713/310; 713/320; 700/32

(58) Field of Classification Search .................. 717/127; 713/300, 310, 320–324, 330, 340; 700/32
See application file for complete search history.

(56) References Cited

U.S. PATENT DOCUMENTS

| | | | |
|---|---|---|---|
| 6,509,788 B2 | 1/2003 | Naffziger et al. | |
| 6,825,711 B2 | 11/2004 | Cohn et al. | |
| 7,913,071 B2 * | 3/2011 | Mallik et al. | 713/1 |
| 7,971,073 B2 * | 6/2011 | Hsu et al. | 713/300 |
| 2002/0053038 A1 | 5/2002 | Buyuktosunoglu et al. | |
| 2002/0140467 A1 | 10/2002 | Naffziger et al. | |
| 2004/0117680 A1 | 6/2004 | Naffziger | |
| 2004/0153679 A1 | 8/2004 | Fitton et al. | |
| 2005/0218871 A1 * | 10/2005 | Kang et al. | 323/265 |
| 2006/0168571 A1 * | 7/2006 | Ghiasi et al. | 717/127 |
| 2006/0253715 A1 * | 11/2006 | Ghiasi et al. | 713/300 |

OTHER PUBLICATIONS

Govil, K. et al.—"Comparing Algorithms for Dynamic Speed-Setting of a Low-Power CPU"—MobiCom '95, Proc. of the 1st Annual Int. Conf. on Mobile Computing and Networking, (1995), pp. 13-25.
Varma, A. et al—"A Control-Theoretic Approach to Dynamic Voltage Scheduling"—CASES '03, Proc. of the 2003 Int. Conf. on Compilers, Architecture and Synthesis for Embedded Systems, Oct. 30-Nov. 1, 2003, pp. 255-266.

\* cited by examiner

*Primary Examiner* — Fahmida Rahman
(74) *Attorney, Agent, or Firm* — John P. O'Banion (57) ABSTRACT

Dynamic voltage and frequency scaling (DVFS) is an effective way to reduce energy and power consumption in microprocessor units. Current implementations of DVFS suffer from inaccurate modeling of power requirements and usage, and from inaccurate characterization of the relationships between the applicable variables. A system and method is proposed that adjusts CPU frequency and voltage based on run-time calculations of the workload processing time, as well as a calculation of performance sensitivity with respect to CPU frequency. The system and method are processor independent, and can be applied to either an entire system as a unit, or individually to each process running on a system.

17 Claims, 5 Drawing Sheets

ADAPTIVE REAL-TIME METHODOLOGY FOR OPTIMIZING ENERGY-EFFICIENT COMPUTING

CROSS-REFERENCE TO RELATED APPLICATIONS

This application is a continuation of U.S. patent application Ser. No. 11/556,651 filed on Nov. 3, 2006, now U.S. Pat. No. 7,971,073, incorporated herein by reference in its entirety, which claims priority from U.S. provisional application Ser. No. 60/733,140, filed on Nov. 3, 2005, incorporated herein by reference in its entirety.

STATEMENT REGARDING FEDERALLY SPONSORED RESEARCH OR DEVELOPMENT

This invention was made with Government support under Contract No. W-7405-ENG-36, awarded by the Department of Energy. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to reducing power consumption in high-performance computing environments, and more particularly to a power-aware algorithm that automatically and transparently adapts microprocessor voltage and frequency settings to achieve significant power reduction and energy savings with minimal impact on performance.

2. Description of Related Art

Computing prowess continues to improve at the expense of higher power and energy consumption. Moore's Law of 1965 made the bold prediction that the number of transistors on a microprocessor would double every 18 months. However, with each doubling in the number of transistors comes a corresponding increase in power consumption. High power and energy consumption burdens the electrical supply load, increases operating costs, and has negative economic and environmental impact to society. More importantly, when the temperature in a computing system is high, system reliability and productivity deteriorate exponentially.

Figure 1:
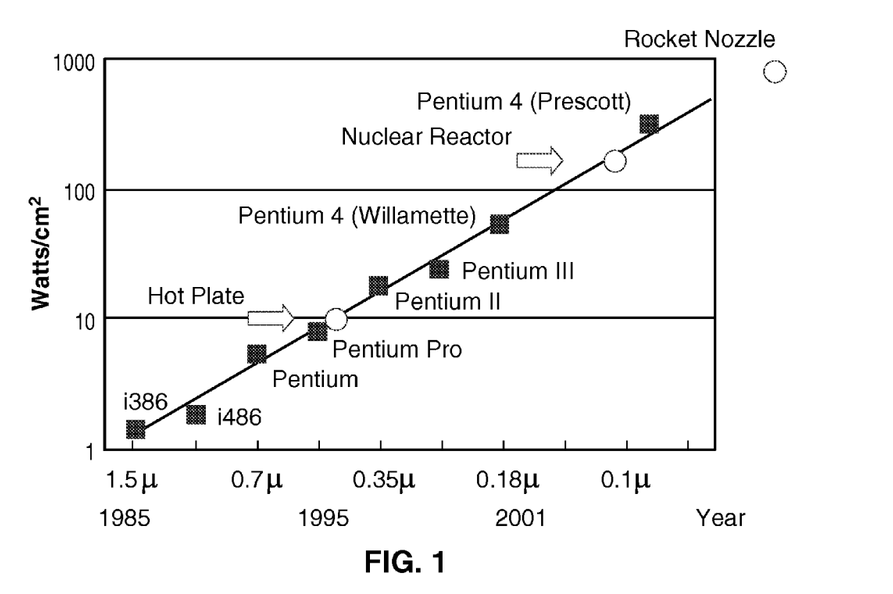
FIG. 1 is a graph depicting Moore's Law for power consumption.

The reliability and productivity concerns are more critical in high-performance computing (HPC). For example, Table 1 shows the current reliability of leading-edge supercomputers. With power densities doubling every 18-24 months (FIG. 1) and large-scale HPC systems continuing to increase in size, the amount of heat generated (and hence, temperature) continues to rise. And as a rule of thumb, Arrhenius' equation, as applied to microelectronics, notes that for every 10° C. (18° F.) increase in temperature, the failure rate of a system doubles.

Informal empirical data taken from late 2000 to early 2002 supports Arrhenius' equation. In the winter, when the temperature inside a warehouse-based work environment was around 70° F.-75° F., the traditional cluster system failed approximately once a week; in the summer, when the temperature increased to 85° F.-90° F., the cluster failed twice a week.

Even more worrisome is how this computing environment affected the results of the Linpack benchmark running on a very dense, 18-node Beowulf cluster. After ten minutes of execution, the cluster produced an answer outside the residual (i.e., a silent error) when running in the dusty 85° F. warehouse but produced the correct answer when running in a 65° F. machine-cooled room. Clearly, the HPC community must worry about power and its effect on reliability.

Furthermore, every hour that an HPC system is unavailable translates to lost business or lost productivity. This issue is of extraordinary importance for companies that rely on parallel-computing resources for their business, as noted in Table 2.

In short, ignoring power consumption as a design constraint results in a system with high operational costs for power and cooling and can detrimentally impact reliability, which translates into lost productivity.

Dynamic voltage and frequency scaling (DVFS) is widely recognized as an effective way to reduce high power consumption in microprocessors (CPUs). Examples of DVFS mechanisms include powerNow! (AMD) and SpeedStep (Intel). DVFS exports several frequency-voltage settings and each CPU runs at a particular setting at any given time. The many settings provide various power-performance tradeoffs: the faster a CPU runs, the more power it consumes; conversely, the slower a CPU runs, the less power it consumes. DVFS allows a CPU to switch between different frequency-voltage settings at run time under the control of software.

However, the power-performance tradeoffs provided by the DVFS mechanism should be used judiciously. A computer user is not usually willing to sacrifice performance in exchange for lower power consumption. Thus, one goal for power management methodology via DVFS is to create a schedule of the use of CPU frequency-voltage settings over time so as to reduce CPU power consumption while minimizing performance degradation. A DVFS scheduling algorithm (referred hereinafter as a "DVFS algorithm") needs to determine when to adjust the current frequency-voltage setting (i.e., scaling point) and to which new frequency-voltage setting (i.e., scaling factor) the system is adjusted. For example, a DVFS algorithm may set the scaling points at the beginning of each fixed-length time interval (say, every 10 ms) and determine the scaling factors by predicting the upcoming CPU workload based on the past history.

Existing DVFS algorithms possess a number of drawbacks. For example, many DVFS algorithms are based only on CPU utilization, That is, if a computer user is reading a document for an extended period of time, a DVFS algorithm would automatically scale down the frequency and supply voltage of the CPU in order to reduce power consumption. While this strategy is ideal for the interactive use of the computer, many computer systems spent a significant portion of a day in non-interactive use and with full CPU utilization. Given that the power consumption is proportional to the work being processed by a CPU, it is this full utilization of CPU that consumes the most energy and causes the temperature to rise up significantly. As a result, the power-aware algorithms that work well for the interactive use fail miserably with respect to HPC applications. In addition, DVFS algorithms based solely on CPU utilization only provide loose control over DVFS-induced performance slowdown. This is because the CPU utilization ratio by itself does not provide enough timing information.

A few other DVFS algorithms address the cases where the CPU is fully utilized, but their effectiveness falls short one way or the other. For example, many of them only target at the savings of a part of CPU power consumption. This overestimate of the power reduction achieved by DVFS encourages the DVFS algorithm to set the CPU to a low frequency-voltage setting. Because the CPU speed is running very slowly, other sources of power consumption remain switched "on" for too long and their energy consumption increases to a point that eliminates the power savings of DVFS.

Specifically, many DVFS algorithms use the equation $P(f)=k \cdot V^2 \cdot f$ to model CPU power consumption where f is the frequency, V is the voltage and k is a constant. This model represents only part of the CPU power consumption. Current CPUs also consume power via leakage current. This type of power consumption increases and becomes critical as the processor enters into submicron scales and, therefore, cannot be ignored. In fact, power is consumed not only by CPUs, but also by other system components, such as storage media. Ignoring these other sources for power consumption will lead to the design of an over-optimistic DVFS algorithm which ends up with more overall energy consumption.

DVFS algorithms may also be too pessimistic and lose great opportunities in exploiting DVFS for maximum energy savings. Many existing DVFS algorithms assume that the performance of an application scales perfectly with respect to CPU speed, i.e., the system performance will become half if CPU speed is reduced to half. It is only in the worst case that the execution time doubles when the CPU speed is halved. Thus, a DVFS algorithm based on such a model will schedule a faster CPU speed and complete a task far ahead its deadline, whereas a slower CPU speed can be scheduled that still meets its performance deadline but consumes less power.

Specifically, many DVFS algorithms use the equation $T(f) = W \cdot (1/f)$ to model the execution time of a program, where $T(f)$, in seconds, is the running time of a task at frequency f, and W, in cycles, is the amount of required CPU work. In practice, this model overly exaggerates the impact that CPU speed has on execution time, especially for applications that involve a lot of memory or disk accesses. In addition, W is not always a constant; for many programs, W is a function of CPU speed f. These two factors result in an underestimation of power savings that DVFS can bring for certain types of programs. Consequently, significantly more energy is consumed by the CPU.

Another drawback of existing DVFS algorithms is the assumption of a relationship between frequency f and voltage V in each setting:

$$f = \frac{K \cdot (V - V_T)^\alpha}{V},$$

where K, $V_T$, and $\alpha$ are constants, $1 \leq \alpha \leq 2$, and $V_T \ll V$. Unfortunately, this relationship is not observed in real DVFS processors because current DVFS processors do not support continuously variable frequencies and voltages. For example, Intel's Pentium M® processors only support clock frequencies and voltages that are multiples of 100 MHz and 16 mV, respectively. In contrast, the relationship $$f = \frac{K \cdot (V - V_T)^\alpha}{V}$$

can only be satisfied if continuously variable frequencies are supported. As a result, existing DVFS algorithms that have been proven to be optimal based on this particular frequency-voltage relationship may no longer be optimal (or even effective) if the relationship is not satisfied.

Finally, DVFS algorithms may not be real time based. A few DVFS algorithms rectify the aforementioned drawbacks at a price of becoming non-real-time. Non-real-time DVFS algorithms often involve profiling of the execution behavior of a program (or its structures) at all possible frequency-voltage settings, and then using the profile to select the lowest frequency that satisfies the performance constraint to execute the program. The problems with these DVFS approaches are threefold. First, they are all essentially profile-based and generally require the source code to be modified. As a result, these approaches are not completely transparent to the end user. Second, because the profile information can be influenced by program input, these approaches are input-dependent. Third, the instrumentation of source code may alter the instruction access pattern, and therefore, may produce profiles that are considerably different from the execution behavior of the original code. So, in theory, while these approaches might provide the maximum benefit relative to performance and power, they are of little use to end-user applications.

BRIEF SUMMARY OF THE INVENTION

The present invention is a system and method that adjusts CPU frequency and voltage based on run-time calculations of the workload processing time, as well as a calculation of performance sensitivity with respect to CPU frequency. The system and method are processor independent, and can be applied to either an entire system as a unit, or individually to each process running on a system.

An aspect of the invention is a computer-implemented method for optimizing energy consumption for an active event, comprising: measuring a workload processing rate for a range of CPU frequencies; computing a run-time performance sensitivity factor; wherein the performance sensitivity factor is computed relative to a change in CPU frequency; determining a target frequency; wherein the target frequency is a minimum frequency whose predicted performance slowdown does not exceed a maximum possible performance slowdown; and setting the CPU frequency to the target frequency; updating the workload processing rate for the target frequency; and repeating the method until the event is no longer active; wherein energy consumption is optimized under a performance constraint.

In an embodiment of this aspect the step of setting the CPU frequency to the target frequency comprises: emulating the target frequency if the target frequency is unsupported; wherein the emulating step comprises setting the target frequency to a plurality of supported CPU frequencies according to a time ratio. In another embodiment, the emulating step further comprises: locating supported frequencies above and below the target frequency; calculating a ratio of time to operate at the supported frequencies above and below the target frequency; and setting the CPU frequency for each supported frequency above and below the target frequency according to the ratio of time.

In another embodiment, the workload processing rate relates to an entire computer system as a unit; and energy consumption for the entire computer system is optimized. In another embodiment, wherein the event comprises supplying power to a CPU of an entire computer system; and the method operates on the entire computer system as a whole.

In still another embodiment, at least one individual process is operating on a computer system; the workload processing rate relates to each individual process operating on a computer system; the method runs separately with respect to each individual process; and energy consumption for each individual process is optimized. In another embodiment, a computer system comprises at least one event; the event comprises an individual process operating on a computer system; and the method operates individually with respect to each event on the computer system.

Yet another embodiment further comprises restarting the method if a triggering condition occurs; wherein the restarting step occurs while the event continues to be active.

Another aspect of the invention is a system for optimizing energy consumption for an active event, comprising: a computer; and programming on the computer for executing the steps of: measuring a workload processing rate for a range of CPU frequencies; computing a run-time performance sensitivity factor; wherein the performance sensitivity factor is computed relative to a change in CPU frequency; determining a target frequency; wherein the target frequency is a minimum frequency whose predicted performance slowdown does not exceed a maximum possible performance slowdown; setting the CPU frequency to the target frequency; updating the workload processing rate for the target frequency; and repeating the method until the event is no longer active; wherein energy consumption is optimized under a performance constraint.

In one embodiment of this aspect, the step of setting the CPU frequency to the target frequency comprises: emulating the target frequency if the target frequency is unsupported; wherein the emulating step comprises setting the target frequency to a plurality of supported CPU frequencies according to a time ratio. In another embodiment, the emulating step further comprises: locating supported frequencies above and below the target frequency; calculating a ratio of time to operate at the supported frequencies above and below the target frequency; and setting the CPU frequency for each supported frequency above and below the target frequency according to the ratio of time.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes, the present invention is generally embodied in FIG. 2 through FIG. 7. It will be appreciated that the system and method may vary as to configuration and as to details of the parts, and as to the specific steps and sequence, without departing from the basic concepts as disclosed herein.

The instant invention embodies a transparent and self-adapting run-time system for power awareness, or, more specifically, a power-aware run-time system that has tight performance-slowdown control and can deliver considerable energy savings.

1. Theoretical Foundation

Consider a DVFS system that exports n frequency-power settings $\{(f_i, P_i)\}$. Without loss of generality, assume $0 < f_1 < \ldots < f_n$. $f_{min}$ and $f_{max}$ are sometimes used to refer to $f_1$ and $f_n$, respectively. The traditional DVFS scheduling problem is formulated as the following energy optimization problem: given a workload W in cycles and a deadline D in seconds, find a schedule $\{t_i^*\}$ such that when the CPU runs at speed $f_i$ for $t_i^*$ seconds with power consumption $P_i$, the total energy usage is minimized, the required work W is performed, and the deadline D is met; that is, $$t^* = \arg t_i \min \{E_{min}(d) : d \leq D\} \quad (1)$$

where $$E_{min}(d) = \min \left\{ \sum_i t_i \cdot P_i : \sum_i t_i \cdot f_i = W, \sum_i t_i = d, t_i \geq 0 \right\} \quad (2)$$

Function $E_{min}(d)$ represents the lowest energy that any DVFS schedule executes the entire program in exactly d seconds can consume.

The present invention generalizes the traditional DVFS scheduling problem by replacing the equality $$\sum_i t_i \cdot f_i = W$$

in the definition of function $E_{min}(d)$ with $$\sum_i t_i / T_i = 1,$$

where $T_i$ stands for the execution time of a program running at frequency $f_i$. Substituting $t_i$ with $r_i \cdot T_i$ yields a new definition of $E_{min}(d)$ $$E_{min}(d) = \min\left\{\sum_i r_i \cdot E_i : \sum_i r_i \cdot T_i = d_i \sum_i r_i = 1, r_i \geq 0\right\} \quad (3)$$

where $E_i = P_i \cdot T_i$ is the energy consumption running at frequency $f_i$.

2. New Theorem

The present invention includes the development of a theorem that depicts the optimal solution for the above DVFS scheduling problem, as stated below. Intuitively, the new theorem states that if the piecewise-linear function that connects points $\{(T_i, E_i)\}$ is convex and non-increasing on $[T_n, T_1]$, then running at a CPU speed that finishes the execution right at the deadline is the most energy-efficient DVFS schedule. If the desired CPU speed is not one of the supported settings, it can be emulated by the two neighboring speeds and the resulting energy consumption is minimized.

Theorem

If $T_1 > T_2 > \ldots > T_n$ and $0 \geq \dfrac{E_2 - E_1}{T_2 - T_1} \geq \dfrac{E_3 - E_2}{T_3 - T_2} \geq \ldots \geq \dfrac{E_2 - E_{n-1}}{T_n - T_{n-1}}$ then $t_i^* = \begin{cases} \dfrac{D - T_{j+1}}{T_j - T_{j+1}} \cdot T_j & i = j \\ D - t_j^* & i = j+1 \\ 0 & \text{otherwise} \end{cases}$ where $T_{j+1} < D \leq T_j$ (4)

For the case where $D \geq T_1$ or $T_1 = \ldots = T_n$, there is an even simpler description of the optimal solution: a program will run entirely at frequency $f_j$, where $j = \arg_i \min \{E_i\}$.

3. β-adaptation Algorithm for a Power-aware Run-time System

Based on the above theorem, a new interval-based DVFS algorithm, the "β-adaptation" algorithm, was developed. At a high level, the β-adaptation algorithm exploits the opportunities where the CPU frequency is not a determining factor for program performance, defined as "non-CPU-boundedness", to run the CPU at a lower frequency so that performance degradation can be minimized. To determine when non-CPU-boundedness occurs, the algorithm measures the differences among frequencies in terms of workload processing rate. A program has a fixed amount of work to be completed, and the rate of completing this work (called workload processing rate) at each CPU frequency is different. However, if the differences among frequencies are small, then non-CPU-boundedness is indicated.

The instant invention, leveraging the DVFS mechanism, comprises an automatically-adapting, power-aware algorithm that is transparent to end-user applications and can deliver considerable energy savings with tight control over DVFS-induced performance slowdown. Performance slowdown is defined herein as the increase in relative execution time with respect to the execution time when the program is running at the peak CPU speed. A user can specify the maximum allowed performance slowdown δ (e.g., δ=5%), and the algorithm will schedule CPU frequencies and voltages in such a way that the actual performance slowdown does not exceed δ.

The β-adaptation algorithm is an interval-based scheduling algorithm, that is, scheduling decisions are made at the beginning of time intervals of the same length (e.g., every second). Interval-based algorithms are generally easy to implement because they make use of existing "alarm clock" functionality found in the operating system. By default, this power-aware algorithm, and its software realization as part of the run-time system, sets the interval length I to be one second. However, the algorithm allows a user to change this value per program execution.

In contrast to previous approaches, this power-aware algorithm does not require any application-specific information a priori (e.g., profiling information), and, more generally, it is transparent to end-user applications. Therefore, such information is implicitly gathered, such as by monitoring the intensity level of off-chip accesses during each interval I in order to make smart scheduling decisions. Intuitively, when the intensity level of off-chip accesses is high, it indicates that program execution is in a non-CPU-intensive phase, indicating that this phase can execute at a lower CPU frequency (and voltage) without affecting its performance.

While conceptually simple, this type of algorithm must overcome the following obstacle in order to be effective: the quantification of the intensity level of off-chip accesses needs to have a direct correlation between CPU frequency changes and execution-time impact; otherwise, the tight control of DVFS-induced performance slowdown is difficult to achieve. For example, one might think that the high cache-miss rate is a suitable indicator that program execution is in a non-CPU-intensive phase. However, unless a prediction can be made as to how the execution time will be lengthened for every lower CPU frequency that may be executed in this non-CPU-intensive phase, the information of the high cache-miss rate will not help in the selection of the appropriate CPU frequency to maintain tight control of DVFS-induced performance slowdown. Therefore, a model is needed that associates the intensity level of off-chip accesses with respect to total execution time.

Specifically, the development of the algorithm started with the observation that many real-life applications, especially scientific computations, can be modeled using a simple performance model:

$$T(f) = c_1\left(\frac{1}{f}\right) + c_0,$$

where $c_0$ and $c_1$ are constant. This performance model can then be re-formulated as a single-parameter model as follows:

$$\frac{T(f)}{T(f_{max})} = \beta\left(\frac{f_{max}}{f}\right) + (1 - \beta) \quad (5)$$

where $$\beta = \frac{c_1}{c_1 + c_0 \cdot f_{max}}.$$

The parameter β is a value between 0 and 1 and indicates the sensitivity of the application performance to the change in CPU speed. If β=1, that means the execution time will be cut in half when the CPU speed is twice as fast; equivalently, $T(f) = \frac{c_1}{f}$. If $\beta = 0$, the execution time will remain constant even when running at the lowest frequency, i.e., $T(f)=c_0$.

In general, a CPU-bound application will have a $\beta$ value that is close to one, while a memory- or I/O-bound application will have a $\beta$ value close to zero. Conceptually, it is similar to the scalability of performance in the field of parallel processing, but the number of processors is replaced by various CPU frequencies.

Applying the theorem in Section 2 to the performance model for T(f) given hereinabove results in the following corollary:

$$\text{If } T(f) = c_1\left(\frac{1}{f}\right) + c_0 \qquad (6)$$

where $c_1 \neq 0$ and $$\frac{P_1 - 0}{f_1 - 0} \leq \frac{P_2 - P_1}{f_2 - f_1} \leq \frac{P_3 - P_2}{f_3 - f_2} \leq \ldots \leq \frac{P_n - P_{n-1}}{f_n - f_{n-1}}$$

then $$0 \geq \frac{E_2 - E_1}{T_2 - T_1} \geq \frac{E_3 - E_2}{T_3 - T_2} \geq \ldots \geq \frac{E_n - E_{n-1}}{T_n - T_{n-1}} \qquad (7)$$

Specifically, given a time constraint D, the present invention DVFS algorithm seeks an ideal CPU frequency $$f^* = \max\left(f_{min}, \frac{f_{max}}{1 + \delta/\beta}\right)$$

where $\delta$ defines the relative deadline D, i.e., $D=(1+\delta)\cdot T(f_{max})$. If this ideal CPU frequency is not supported by the underlying DVFS processor, then the present invention will emulate this particular frequency using the two immediately-neighboring supported frequencies; that is, find $f_j$ and $f_{j+1}$ such that $f_j \leq f^* < f_{j+1}$ and run the entire program at for r percent of time and at $f_{j+1}$ for (1-r) percent of time, where the ratio r is defined as follows:

$$r = \frac{(1 + \delta/\beta)/f_{max} - 1/f_{j+1}}{1/f_j - 1/f_{j+1}}. \qquad (8)$$

Intuitively, this corollary states that as long as the DVFS system is well-designed, one can use the optimal solution in our theorem to schedule the use of DVFS settings so as to minimize the energy consumption without violating any given performance constraint. The DVFS system is well-designed, according to the corollary, if each of every DVFS setting has the lowest power consumption compared to the best possible combination of all other settings that emulates its speed. This means that if $$f = K \cdot \frac{(V - V_T)^\alpha}{V},$$

the DVFS processor will be well-designed. On the other hand, a well-designed DVFS processor does not necessarily require this frequency-voltage relationship to be satisfied. Hence, the corollary is more capable of handling real-life situations, that is, when only a discrete set of CPU frequencies and voltages is supported. Note that a well-designed DVFS processor can be achieved by carefully choosing frequency-voltage settings at the system design time.

More specifically, the $\beta$-adaptation model is based on the MIPS rate (i.e., millions of instructions per second), which can correlate the execution-time impact with CPU frequency changes:

$$\frac{T(f)}{T(f_{max})} \approx \frac{mips(f_{max})}{mips(f)} \approx \beta\left(\frac{f_{max}}{f} - 1\right) + 1 \qquad (9)$$

The leftmost term, $$\frac{T(f)}{T(f_{max})},$$

represents the execution-time impact of running at CPU frequency f in terms of the relative execution time with respect to running at the peak CPU frequency $f_{max}$. The rightmost term, $$\beta\left(\frac{f_{max}}{f} - 1\right) + 1,$$

introduces a parameter, $\beta$, that quantifies the intensity level of on-chip accesses (and indirectly, off-chip accesses). By definition, $\beta=1$ indicates that execution time doubles when the CPU speed is halved, whereas $\beta=0$ means that execution time remains unchanged, regardless of the CPU speed. Finally, the middle term provides a way to describe the observed execution-time impact and is used to adjust the value of $\beta$.

Ideally, the value of $\beta$ was known a priori, Equation (9) could be used to select an appropriate CPU frequency to execute in the current interval such that the DVFS-induced performance slowdown is tightly constrained. However, it is assumed that $\beta$ is not known a priori because the power-aware algorithm does not require any application-specific information a priori. Therefore, the challenge for the automatically-adapting, power-aware algorithm lies in the "on the-fly" estimation of $\beta$ at run time.

To estimate $\beta$ at run time, a regression method over Equation (9) is used, taking into account the fact that most DVFS-enabled microprocessors support a limited set of CPU frequencies to perform the regression. That is, given n CPU frequencies $\{f_1, \ldots, f_n\}$, a particular $\beta$ value is derived that minimizes the least-squared error:

$$\min \sum_{i=1}^{n} \left\| \frac{mips(f_{max})}{mips(f)} - \beta\left(\frac{f_{max}}{f} - 1\right) - 1 \right\|^2 \qquad (10)$$

By equating the first differential of Equation (10) to zero, $\beta$ can be derived as a function of the MIPS rates and CPU frequencies, as follows:

$$\beta = \frac{\sum_{i=1}^{n}\left(\frac{f_{max}}{f_i}-1\right)\left(\frac{mips(f_{max})}{mips(f_i)}-1\right)}{\sum_{i=1}^{n}\left(\frac{f_{max}}{f_i}-1\right)^2} \quad (11)$$

Once the value of β is calculated using Equation (11), that value can be plugged into Equation (9) and the lowest CPU frequency f can be calculated whose predicted performance slowdown $$\beta\left(\frac{f_{max}}{f}-1\right)$$

does not exceed the maximum possible performance slowdown δ. Mathematically, this establishes the following relationship:

$$\delta = \beta\left(\frac{f_{max}}{f}-1\right).$$

By solving this equation for f, the desired frequency f* for running the CPU is determined:

$$f^* = \max\left(f_{min}, \frac{f_{max}}{1+\delta/\beta}\right) \quad (12)$$

Summarizing this theory results in the β-adaptation algorithm, as follows:
Hardware:
n frequencies $\{f_1, \ldots, f_n\}$.
Parameters:
I: the time-interval size (default, 1 second).
δ: slowdown constraint (default 5%).
Algorithm:
Initialize mips($f_i$), i=1, ..., n, by executing the program at $f_i$ for I seconds.
Repeat
1. Compute coefficient β.

$$\beta = \frac{\sum_{i=1}^{n}\left(\frac{f_{max}}{f}-1\right)\left(\frac{mips(f_{max})}{mips(f_i)}-1\right)}{\sum_{i=1}^{n}\left(\frac{f_{max}}{f_i}-1\right)^2}$$

2. Compute the desired frequency f*.

$$f^* = \max\left(f_{min}, \frac{f_{max}}{1+\delta/\beta}\right)$$

3. Execute the current interval at f*.
4. Update mips(f*).
Until the program is completed.
In essence, this power-aware algorithm wakes up every I seconds. The algorithm then calculates the value of β using the most up-to-date information on the MIPS rate based on Equation (11). Once β is derived, the algorithm computes the CPU frequency f for the interval based on Equation (12). Since a DVFS-enabled microprocessor only supports a limited set of frequencies, the computed frequency f* may need to be emulated in some cases. This sequence of steps is repeated at the beginning of each subsequent interval until the program executes to completion.

The emulation scheme is as follows, with respect to step 3, shown above:
3. Perform the following steps:
(a) Figure out $f_j$ and $f_{j+1}$.

$$f_j \leq f^* < f_{j+1}$$

(b) Compute the ratio r.

$$r = \frac{(1+\delta/\beta)/f_{max} - 1/f_{j+1}}{1/f_j - 1/f_{j+1}}$$

(c) Run r·I seconds at frequency $f_j$.
(d) Run (1−r)·I seconds at frequency $f_{j+1}$.
The ratio r denotes the percentage of time to execute at frequency $f_j$.

To extend the β-adaptation algorithm from the uniprocessor environment that is implicitly assumed above to a multiprocessor environment the algorithm is simply replicated onto each processor and each local copy is run asynchronously. This strategy is adopted for the following reasons. First, the intensity level of off-chip accesses is a per-processor metric. Second, a coordination-based power-aware algorithm would need extra communication, and likely, synchronization—both of which add to the overhead costs (in terms of performance and energy) of running the power-aware algorithms. And as noted in Section A.2, the β-adaptation algorithm running asynchronously on each processor is quite effective in saving energy while minimizing impact on performance.

In summary, the β-adaptation algorithm is a power-aware and interval-based algorithm that is parameterized by two user-tunable variables: the maximum performance-slowdown constraint δ and the interval length I. The default values of which are 5% and one second, respectively. To facilitate an empirical evaluation of the effectiveness of this algorithm, it is implemented in the run-time system, thus creating a power-aware run-time (PART) system. The PART system is then tested on uniprocessor and multiprocessor platforms using appropriate benchmark suites, as discussed in Example B.

The present invention not only performs better than the existing DVFS algorithms, but it also does so without any of the above drawbacks. Whereas previous works were only based on simulation, the present invention has been tested (see example below) on high-performance processors. The strength of evaluating DVFS algorithms on real processors is that some assumptions used in simulators may not be valid for state-of-the-art DVFS processors.

EXAMPLE A

A.1. Testing Platform
Computer Hardware. An HP® notebook computer. This computer included a mobile AMD Athlon XP® 2200+ processor with a 256-KB level-two cache, 256-MB DDR SDRAM memory, 266-MHz front-side bus, a 30-GB hard disk, and a 15-inch TFT LCD display. The CPU supports five frequency-voltage settings as shown in Table 3.

Power Meter. A Yokogawa WT210™ digital power meter was used. This power meter continuously sampled the instantaneous wattage of the system at a rate of 50 kHz (i.e., every 20 µs).

Operating System. Linux 2.4.18.

Benchmarks. A set of representative SPEC (Standard Performance Evaluation Corporation) CPU95 benchmarks was used for the experiments. These benchmarks emphasize the performance of the CPU and memory, but not other computer components such as I/O (disk drives), networking, or graphics.

DVFS Algorithms. Five DVFS algorithms, in addition to that of the present invention.

Testing and Measurements. All benchmarks were compiled by GNU (short for "GNU's Not Unix") compilers with an optimization level of –O6. All benchmarks were run to completion, with each run taking over a minute.

Figure 2:
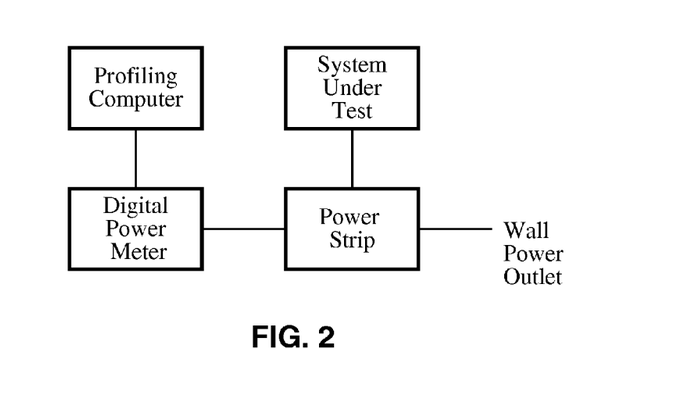
FIG. 2 is a diagram of the basic experimental setup used to evaluate the methodology of the present invention.

To measure the execution time of a benchmark execution, the wall-clock-time query functions provided by the operating system are used. The energy consumption is measured via the power meter, which is connected to a power strip that passes electrical energy from the wall power outlet to the system under test, as shown in FIG. 2.

A.2. Test Results

Table 4 details the comparison of the invention with other DVFS algorithms in the format of "relative-time/relative-energy" with respect to the total execution time and system energy usage when running the application at the highest setting throughout the entire execution across all five aforementioned DVFS algorithms. Relative to both performance and energy consumption, the present invention clearly outperforms the other algorithms.

EXAMPLE B

B.1 Testing Platform

Computer Hardware. A desktop computer based on an Asus K8V Deluxe motherboard. This computer includes an AMD Athlon64 3200+ processor with a 1-MB level-two cache and 1-GB DDR-400 SDRAM memory. The CPU supports four frequency-voltage settings as shown in Table 5.

Power Meter. As in Example A.

Operating System. Linux 2.6.7

Benchmarks. The SPEC CFP95 and CPU2000 benchmarks.

DVFS Algorithms. The method of the present invention and a compiler-based DVFS algorithm.

Testing and Measurement. The SPEC CFP95 benchmarks were compiled using the GNU compiler 3.3.3 with optimization level –O3. The CPU2000 benchmarks were compiled using the Intel compiler 8.1 with the optimization level –xW –ip –O3.

B.2. Test Results

Figure 3:
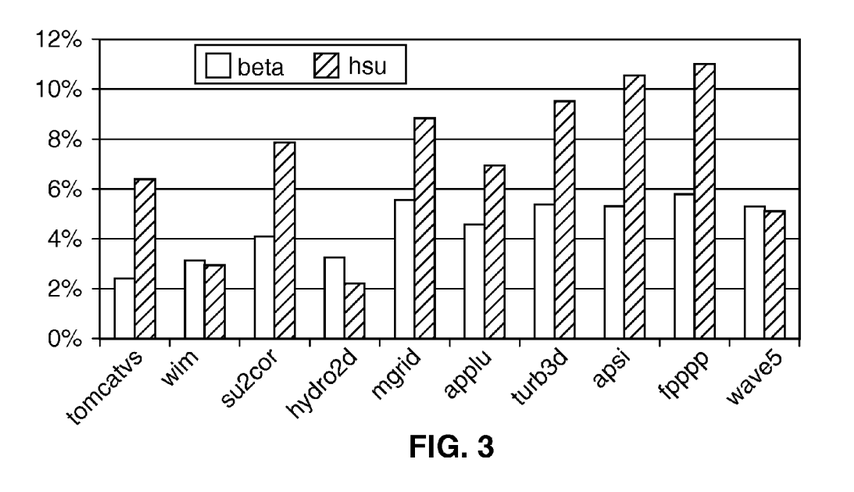
FIG. 3 shows the actual performance slowdown of the β-adaptive run-time approach versus a compiler-based approach.
Figure 4A:
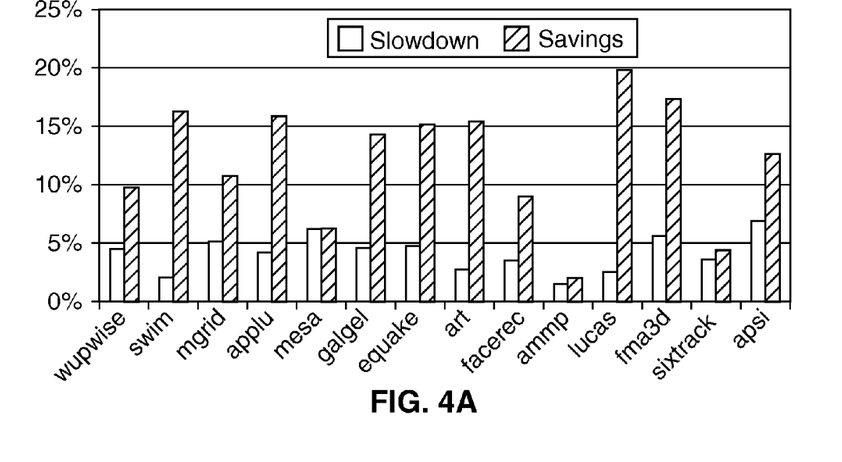
FIGS. 4A4B show the actual performance slowdown and CPU energy savings for the SPEC CFP2000 and SPEC CINT2000 benchmarks, respectively.
Figure 4B:
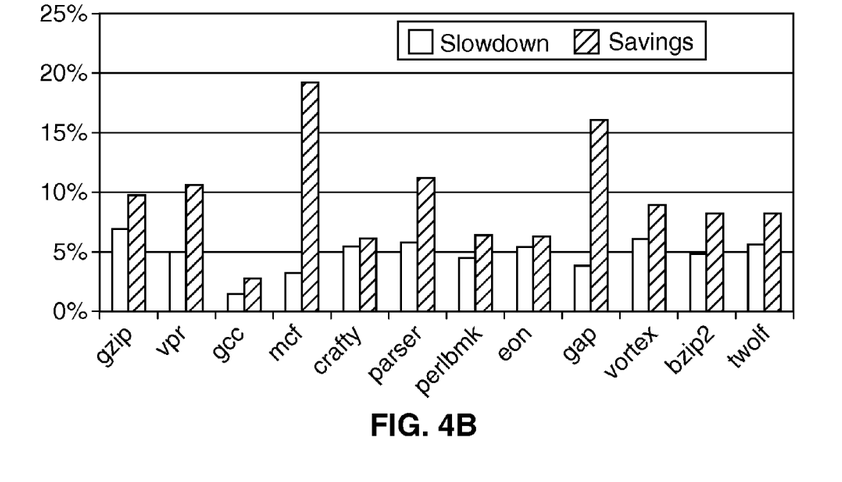

FIG. 3 shows a comparison of the actual performance slowdown between the method of the present invention (denoted as beta) and the compiler approach (denoted as hsu) for SPEC CPU95 benchmarks. It can be seen that the actual performance slowdown induced by the compiler algorithm is poorly regulated, given that the maximum performance-slowdown constraint was specified as 5%. In contrast, the present invention regulates the actual performance slowdown much better.

With respect to SPEC CPU200 benchmarks. FIGS. 5A and 5B show the actual performance slowdown and the CPU energy savings delivered by the present invention. On average, the present invention reduces the CPU energy consumption by 12% with only a 4% actual performance slowdown for SPEC CFP2000 (FIG. 4A); for SPEC CINT2000 (FIG. 4B), the two numbers are 9.5% and 4.8%, respectively.

EXAMPLE C

C.1 Testing Platform

Computer Hardware. Two multiprocessor-based computers. One is a cluster of four Athlon64-based desktop computers as in Example B connected via Gigabit Ethernet. The other is a cluster of four quad-CPU Celestica A8440 servers connected via Gigabit Ethernet. Each Celestica A8440 server includes four AMD Opteron 846 processors with 4-MB level-two cache and 4-GB DDR-333 SDRAM memory. The CPUs support four frequency-voltage setting as shown in Table 5.

Power Meter. Yokogawa WT230.

Operating System. Linux 2.6.7

Benchmarks. NAS (NASA Advanced Supercomputing) MPI benchmarks, version 3.2.

DVFS Algorithms. The method of the present invention.

Testing and Measurement. All benchmarks were compiled using the GNU compiler 3.3.3 with optimization level –O3. LAM/MPI version 7.0.6 was used to run the benchmarks.

C.2. Test Results

Figure 5:
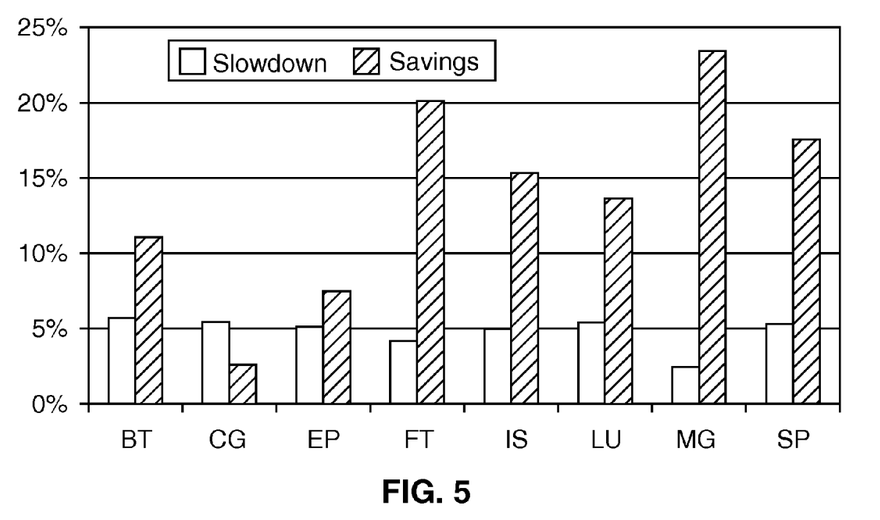
FIG. 5 shows the NAS-MPI for Class B workload on the Athlon64-based cluster.
Figure 6:
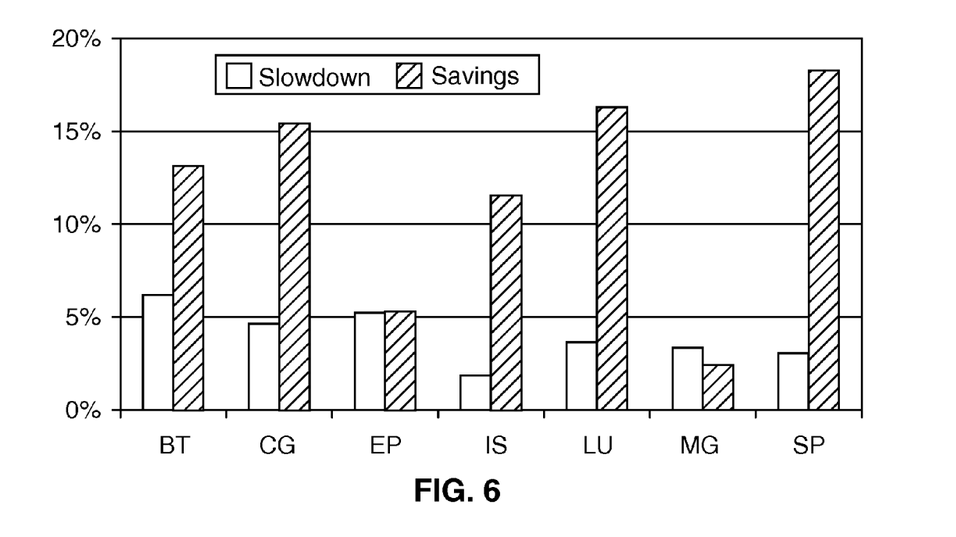
FIG. 6 shows the NAS-MPI for Class C workload on the Athlon64-based cluster.

For the Athlon64 cluster, FIG. 5 shows the actual performance slowdown and CPU energy savings of NAS-MPI for the class B workload. On average, the present invention saves 14% CPU energy at 5% actual performance slowdown. For the class C workload, the average savings is about 12% at a 4% actual performance slowdown, as shown in FIG. 6.

Figure 7:
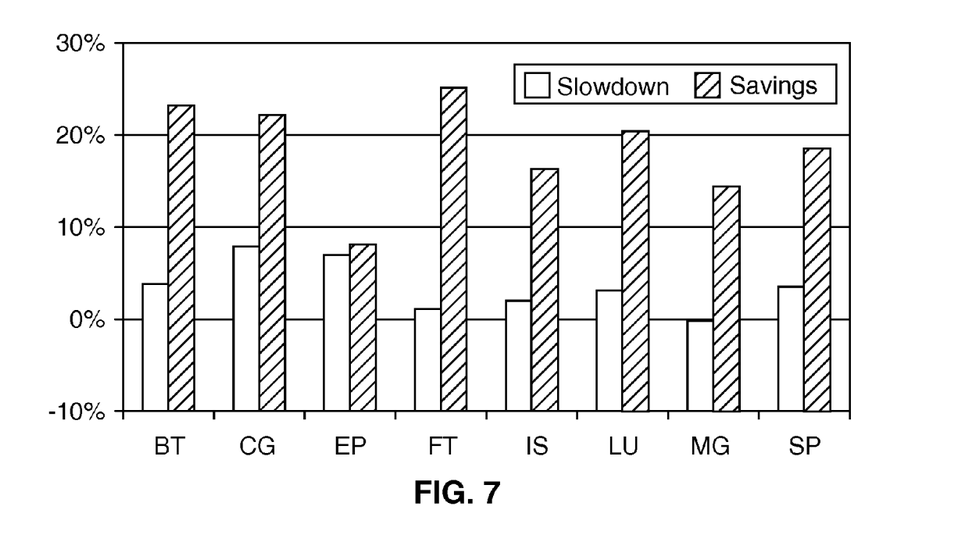
FIG. 7 shows the NAS-MPI for Class C workload on the Opteron-based cluster.

For the Opteron cluster, FIG. 7 shows that the PART system was able to save CPU energy ranging from 8% to 25%, with an average savings of 18%. The average actual performance slowdown is 3%.

EXAMPLE D

D.1. Testing Platform

Computer Hardware. An IBM eServer model 8848-81U server. This computer includes a single-core AMD Opteron processor with 1-MB level-two cache and 1-GB ECC DDDR SDRAM memory. The CPU supports several frequency-voltage settings ranging from 1.0 GHz through 2.6 GHz.

Power Meter. An Extech model 382860 True RMS Power Meter.

Operating System. Novell SUSE Linux version 9.1.

DVFS Algorithm. The method of the present invention.

Benchmarks. Three benchmark suites. The SPEC JBB2005 benchmark suite provides a JAVA based ecommerce style application that is CPU-intensive. This testing base reflects the second (Application) tier of a commercial transaction processing application.

The IOzone.com filesystem benchmark provides a disk I/O intensive testing base which simulates a variety of I/O loads on the test platform, including read, write, reread, rewrite and other mixed loads.

The RAMSpeed benchmark provides a set of memory access style tests which measures the CPU/memory interaction and throughput performance of computer systems.

D.2. Test Results

Energy savings as great as 16.9% were achieved with extremely heavy workloads with minimal performance impact (<10%) using the present invention.

EXAMPLE E

E.1 Testing Platform

Computer Hardware. An HP Proliant ML310-G3 server, model A1560N. This computer includes a dual-core Intel Pentium D model 915 CPU with 2-MB level-two cache and 2-GB DDR2 SDRAM memory. The CPU supports two frequency-voltage settings of 2.4 and 2.8 GHz.

Operating System. Novell SUSE Linux Enterprise Server version 10.1.

Power Meter. As in Example C.

Benchmarks. As in Example D.

DVFS Algorithm. The present invention (CPU based) versus the Intel SpeedStep DVFS algorithm coming with the SUSE Linux distribution.

Testing and Measurements. Multiple benchmarks were run concurrently.

E.2. Test Results

The current invention outperforms the Intel SpeedStep DVFS algorithm for Linux by introducing additional 9% energy savings with a performance slowdown less than 2%, on average, for five different system loads.

4. Conclusion

The instant invention provides a power-aware solution that works on any commodity platform that supports dynamic voltage and frequency scaling (DVFS). Specifically, an embodiment of the power-aware algorithm (β-adaptation algorithm) is implemented as a power-aware run-time (PART) system. The PART system transparently and automatically adapts CPU voltage and frequency so as to reduce power consumption (and energy usage) while minimizing impact on performance. The performance evaluation on both uniprocessor and multiprocessor platforms shows that the system achieves its design goal. That is, the system can save CPU energy consumption by as much as 20% for sequential benchmarks and 25% for parallel benchmarks shown herein, at a cost of 3-5% performance degradation. Moreover, the performance degradation was tightly controlled by our PART system for all the benchmarks.

At a high level, the present invention, an autopilot for delivering an energy-efficient computer system, is analogous to an autopilot program for a car. The goal is to minimize fuel usage while getting to the destination on-time. When approaching a stop light, an autopilot program could put the car in its highest gear, rush to the traffic light, and stop with its wheels spinning and rubber burning while waiting for the signal to change or the autopilot program could direct the car to approach the traffic light at a slower speed and time its arrival to coincide with the traffic light turning to green.

Unfortunately, most computer systems behave like the first type of autopilot program. In a computer system, the processors are often stalled because the required data to operate on has not yet been retrieved from the memory. During these waiting periods, the processors are still running at their fastest clock speed, thereby wasting electrical energy. In contrast, the present invention foresees potential processor stalls and schedules processor speeds in such a way that when they need data to operate on, the data has already been retrieved from memory.

Previous work in this area, targeted at embedded systems rather than supercomputers, has found that predicting processors stalls is very difficult and frequently produces incorrect predictions, resulting in late (sometimes very late) arrival. The present invention is based on a fundamental theorem for developing and characterizing the "best driving pattern" in real time for a computer system. The present invention therefore results in significantly fewer mispredictions. As a result, the present invention not only predicts "traffic-light patterns" in a computer system well and arrives at the destination on-time, but it also minimizes "fuel usage" in a computer system (i.e., minimizes electrical usage) while maintaining high performance.

From a technical standpoint, current high-performance microprocessors (e.g., AMD Opteron®) export a set of frequency-power tradeoffs called settings. The faster a microprocessor runs, the more power it consumes; the slower it runs, the less power it consumes. The present invention intelligently decides when to change a setting and what to change the setting to, in order to minimize the overall energy consumption while maintaining high performance. Since the performance impact for each program at the same microprocessor frequency is different and this information is not known a priori, the present invention "learns it on the fly."

The present invention repeatedly applies the theorem to obtain the best scheduling policy given the performance model it has learned so far. A preliminary evaluation (via physical measurements taken with a highly accurate, industry-strength, digital power meter) shows that the present invention saves as much as 54% on microprocessor energy usage while impacting peak performance by less than 2%. On average, it saves 20% of energy usage for a set of programs from physics, chemistry, and other compute-intensive disciplines.

The present invention comprises a methodological solution to a DVFS scheduling problem that incorporates a single-parameter ($\beta$) performance model that does not depend on the explicit CPU work requirement. The optimal solution for the scheduling problem was characterized via an optimality theorem that does not rely on a specific relationship between frequency and voltage like so many other previous DVFS algorithms assume. In the present invention, the performance model was abstracted as a single parameter $\beta$ and a methodology for computing $\beta$ at run time was devised.

Therefore, the present invention provides a novel methodology that can reduce the intrinsic power and energy requirements of any given computer system. The generality of the methodology offers the advantage of hardware-independence, thus allowing the present invention to be deployed on nearly any commodity system.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Reliability of Leading-Edge Supercomputers.

| System | CPUs | Reliability |
|---|---|---|
| ASCI Q | 8,192 | MTBI: 6.5 hrs. |
| | | HW outage sources: storage, CPU, memory. |
| ASCI White | 8,192 | MTBF: 5 hrs ('01) and 40 hrs ('03). |
| | | HW outage sources: storage, CPU, 3rd-party HW. |
| PSC Lemieux | 3,016 | MTBI: 9.7 hours. |
| Google | 15,000 | 20 reboots/day; 2-3% machines replaced/year. |
| | | HW outage sources: storage, memory. |

MTBF/MTBI: mean time between failures/interrupts

TABLE 2

Estimated Costs of an Hour of System Downtime.

| Service | Cost of One Hour of Downtime |
|---|---|
| Brokerage Operations | $6,450,000 |
| Credit Card Authorization | $2,600,000 |
| eBay | $225,000 |
| Amazon.com | $180,000 |
| Package Shipping Services | $150,000 |
| Home Shopping Channel | $113,000 |
| Catalog Sales Center | $90,000 |

TABLE 3

Energy-Efficient Settings

| f (MHz) | V (volts) |
|---|---|
| 1067 | 1.15 |
| 1333 | 1.25 |
| 1467 | 1.3 |
| 1600 | 1.35 |
| 1800 | 1.45 |

TABLE 4

Experimental Results and Comparison

| Program | β | 2 step | nqPID | freq | mips | B-adaptation |
|---|---|---|---|---|---|---|
| swim | 0.02 | 1.00/1.00 | 1.04/0.70 | 1.00/0.96 | 1.00/1.00 | 1.07/0.63 |
| tomcatv | 0.24 | 1.00/1.00 | 1.03/0.69 | 1.00/0.97 | 1.03/0.83 | 1.02/0.86 |
| su2cor | 0.27 | 0.99/0.99 | 1.05/0.70 | 1.00/0.95 | 1.01/0.96 | 1.03/0.85 |
| compress | 0.37 | 1.02/1.02 | 1.13/0.75 | 1.02/0.97 | 1.05/0.92 | 1.04/0.89 |
| mgrid | 0.51 | 1.00/1.00 | 1.18/0.77 | 1.01/0.97 | 1.00/1.00 | 1.03/0.89 |
| vortex | 0.65 | 1.01/1.00 | 1.25/0.81 | 1.01/0.97 | 1.07/0.94 | 1.06/0.90 |
| turb3d | 0.79 | 1.00/1.00 | 1.29/0.83 | 1.03/0.97 | 1.01/1.00 | 1.05/0.95 |
| go | 1.00 | 1.00/1.00 | 1.37/0.88 | 1.02/0.99 | 0.99/0.99 | 1.06/0.96 |

TABLE 5

Operating Points for Tested Computer Systems

| f (GHz) | V (volts) |
|---|---|
| 0.8 | 0.9 |
| 1.6 | 1.3 |
| 1.8 | 1.4 |
| 2.0 | 1.5 |

What is claimed is:

1. A computer-implemented method for optimizing energy consumption for an active computing event, comprising:
measuring a workload processing rate for a range of central processing unit (CPU) frequencies; and
repeating the following steps until the event is no longer active:
computing a run-time performance sensitivity factor;
said run-time performance sensitivity factor indicating the sensitivity of application performance to a change in CPU speed;
wherein said run-time performance sensitivity factor is computed relative to a change in CPU frequency;
determining a target frequency based on said run-time performance sensitivity factor;
wherein said target frequency comprises a minimum frequency having a predicted performance slowdown that does not exceed a maximum possible performance slowdown; and
setting the CPU frequency to said target frequency; and
updating the workload processing rate for said target frequency;
wherein energy consumption is optimized under a performance slowdown constraint;
wherein the step of setting the CPU frequency to said target frequency comprises:
emulating said target frequency if said target frequency is unsupported;
wherein said emulating step comprises setting said target frequency to a plurality of supported CPU frequencies according to a time ratio and running CPU according to the time ratio.

2. The method recited in claim 1, wherein said emulating step further comprises:
locating supported frequencies above and below said target frequency;
calculating a ratio of time to operate at said supported frequencies above and below said target frequency; and
setting the CPU frequency for each said supported frequency above and below said target frequency according to said ratio of time.

3. The method recited in claim 1:
wherein said workload processing rate relates to an entire computer system as a unit; and
wherein energy consumption for the entire computer system is optimized.

4. The method recited in claim 1:
wherein the event comprises supplying power to the CPU of an entire computer system; and
wherein the method operates on the entire computer system as a whole.

5. The method recited in claim 1:
wherein at least one individual process is operating on a computer system;

wherein said workload processing rate relates to each individual process operating on the computer system;
wherein the method runs separately with respect to each said individual process; and
wherein energy consumption for each said individual process is optimized.

6. The method recited in claim 1:
wherein at least one event operates on a computer system;
wherein each said event comprises an individual process operating on the computer system; and
wherein the method operates individually with respect to each said event operating on the computer system.

7. The method recited in claim 1, further comprising:
restarting the method if a triggering condition occurs;
wherein the restarting step occurs while the event continues to be active.

8. A system for optimizing energy consumption for an active event, comprising:
a computer; and
programming on said computer for executing the steps of:
 measuring a workload processing rate for a range of central processing unit (CPU) frequencies; and
 repeating the following steps until the event is no longer active:
  computing a run-time performance sensitivity factor;
  said run-time performance sensitivity factor indicating the sensitivity of application performance to a change in CPU speed;
  wherein said run-time performance sensitivity factor is computed relative to a change in CPU frequency;
  determining a target frequency based on said run-time performance sensitivity factor;
  wherein said target frequency is a minimum frequency whose predicted performance slowdown does not exceed a maximum possible performance slowdown; and
  setting the CPU frequency to said target frequency; and
  updating the workload processing rate for said target frequency;
 wherein energy consumption is optimized under a performance slowdown constraint;
 wherein the step of setting the CPU frequency to said target frequency comprises:
  emulating said target frequency if said target frequency is unsupported;
  wherein said emulating step comprises setting said target frequency to a plurality of supported CPU frequencies according to a time ratio.

9. The system recited in claim 8, wherein said emulating step further comprises:
locating supported frequencies above and below said target frequency;
calculating a ratio of time to operate at said supported frequencies above and below said target frequency; and
setting the CPU frequency for each said supported frequency above and below said target frequency according to said ratio of time.

10. A computer-implemented method for optimizing energy consumption for an active computing event, comprising:
(a) measuring a workload processing rate for a range of central processing unit (CPU) frequencies;
(b) computing a run-time performance sensitivity factor relative to a change in CPU frequency, said run-time performance sensitivity factor indicating the sensitivity of application performance to a change in CPU speed;
(c) computing a target frequency based on said run-time performance sensitivity factor;
(d) wherein said target frequency comprises a minimum frequency having a predicted performance slowdown which does not exceed a maximum possible performance slowdown;
(e) setting the CPU frequency to said target frequency;
(f) updating the workload processing rate for said target frequency; and
(g) repeating (b) through (f) until the active event is no longer active.
(h) wherein the step of setting the CPU frequency to said target frequency comprises:
 emulating said target frequency if said target frequency is unsupported;
 wherein said emulating step comprises setting said target frequency to a plurality of supported CPU frequencies according to a time ratio and running CPU according to the time ratio and running CPU according to the time ratio.

11. The method recited in claim 10, wherein emulating said target frequency further comprises:
locating supported frequencies above and below said target frequency;
calculating a ratio of time to operate at said supported frequencies above and below said target frequency; and
setting the CPU frequency for each said supported frequency above and below said target frequency according to said ratio of time.

12. The method recited in claim as recited in claim 10:
wherein said workload processing rate relates to an entire computer system as a unit; and
wherein energy consumption for the entire computer system is optimized.

13. The method recited in claim 10:
wherein the event comprises supplying power to the CPU of an entire computer system; and
wherein the method operates on the entire computer system as a whole.

14. The method recited in claim 10:
wherein at least one individual process is operating on a computer system;
wherein said workload processing rate relates to each individual process operating on the computer system;
wherein the method runs separately with respect to each said individual process; and
wherein energy consumption for each said individual process is optimized.

15. The method recited in claim 10:
wherein at least one event operates on a computer system;
wherein each said event comprises an individual process operating on the computer system; and
wherein the method operates individually with respect to each said event on the computer system.

16. The method recited in claim 10, further comprising:
if a triggering condition occurs, repeating steps (a) through (g) while the event continues to be active.

17. A computer-implemented method for optimizing energy consumption for an active computing event, comprising:
(a) measuring a workload processing rate for a range of central processing unit (CPU) frequencies;
(b) computing a run-time performance sensitivity factor relative to a change in CPU frequency, said run-time performance sensitivity factor indicating the sensitivity of application performance to a change in CPU speed;

(c) computing a target frequency based on said run-time performance sensitivity factor;
(d) wherein said target frequency comprises a minimum frequency having a predicted performance slowdown which does not exceed a maximum possible performance slowdown;
(e) setting the CPU frequency to said target frequency;
(f) updating the workload processing rate for said target frequency; and
(g) repeating (b) through (f) until the active event is no longer active;
(h) wherein at least one individual process is operating on a computer system;
(i) wherein said workload processing rate relates to each said individual process operating on the computer system;
(j) wherein the method runs separately with respect to each said individual process; and
(k) wherein energy consumption for each said individual process is optimized.

\* \* \* \* \*